United States Patent
Nelliappan et al.

(10) Patent No.: US 9,765,211 B2
(45) Date of Patent: Sep. 19, 2017

(54) POLYMERIC POWDER COMPOSITION AND A METHOD OF PRODUCING SAME

(71) Applicant: Rohm and Haas Company, Philadelphia, PA (US)

(72) Inventors: Veera G. Nelliappan, North Wales, PA (US); Eric G. Lundquist, North Wales, PA (US); Joseph R. Adamo, Souderton, PA (US)

(73) Assignee: Rohm and Haas Company, Philadelphia, PA (US)

( * ) Notice: Subject to any disclaimer, the term of this patent is extended or adjusted under 35 U.S.C. 154(b) by 186 days.

(21) Appl. No.: 14/782,359

(22) PCT Filed: Mar. 4, 2014

(86) PCT No.: PCT/US2014/020193
§ 371 (c)(1),
(2) Date: Oct. 5, 2015

(87) PCT Pub. No.: WO2014/175964
PCT Pub. Date: Oct. 30, 2014

(65) Prior Publication Data
US 2016/0040003 A1 Feb. 11, 2016

Related U.S. Application Data

(60) Provisional application No. 61/815,042, filed on Apr. 23, 2013.

(51) Int. Cl.
C08L 33/14 (2006.01)
C08J 3/12 (2006.01)

(52) U.S. Cl.
CPC .............. *C08L 33/14* (2013.01); *C08J 3/122* (2013.01); *C08J 3/126* (2013.01); *C08J 2309/00* (2013.01); *C08J 2311/02* (2013.01); *C08J 2325/04* (2013.01); *C08J 2327/06* (2013.01); *C08J 2331/04* (2013.01); *C08J 2333/08* (2013.01); *C08J 2333/12* (2013.01); *C08J 2335/04* (2013.01); *C08L 2205/02* (2013.01)

(58) Field of Classification Search
CPC ....... C08L 33/14; C08L 2205/02; C08J 3/122; C08J 3/126; C08J 2309/00; C08J 2311/02; C08J 2325/04; C08J 2327/06; C08J 2331/04; C08J 2333/08; C08J 2333/12; C08J 2335/04
See application file for complete search history.

(56) References Cited

U.S. PATENT DOCUMENTS

| 3,998,768 A | 12/1976 | Pettit, Jr. | |
| 4,892,910 A * | 1/1990 | Klesse et al. | ............ B01D 1/18 264/12 |
| 6,288,174 B1 | 9/2001 | Ikegami et al. | |
| 2005/0043453 A1 | 2/2005 | Chang et al. | |
| 2006/0148931 A1* | 7/2006 | Xie et al. | ............ B60C 1/0016 523/201 |
| 2008/0097019 A1* | 4/2008 | Lee et al. | ............ C09D 151/04 524/425 |
| 2009/0061343 A1* | 3/2009 | Lai et al. | ............ G03G 9/09314 430/107.1 |

FOREIGN PATENT DOCUMENTS

EP        0121854        10/1984

OTHER PUBLICATIONS

EP Response to Office Action dated Feb. 10, 2016; from EP counterpart Application No. 14713989.3.
Chinese Office Action received Jan. 23, 2016; from counterpart Chinese Application No. 201480021094.9.
PCT Search Report dated Jun. 30, 2014; from PCT corresponding Application No. PCT/US2014/020193.
PCT IPRP dated Oct. 27, 2015; from PCT corresponding Application No. PCT/US2014/020193.
EP Office Action dated Aug. 14, 2015; from EP corresponding Application No. 14713989.3.

\* cited by examiner

*Primary Examiner* — Nathan M Nutter

(57) ABSTRACT

A polymeric powder composition prepared from an emulsion blend comprising from 95 to less than 100 percent by weight latex based substrate polymer, wherein the latex based substrate polymer comprises units derived from one or more monomers selected from the group consisting of alkyl (meth)acrylates, functionalized alkyl(meth)acrylates styrene, acrylonitrile, butadiene, chloroprene, vinyl chloride, (meth)acrylates, vinyl acetate, and combinations of two or more thereof and wherein the latex based substrate polymer has a Tg equal to or greater than 60° C. and an average particle size between 100 nm and 10 μm; and from greater than 0 to 5 percent by weight binder latex polymer, wherein the binder has a Tg of equal to or less than 10° C. and has units derived from one or more (meth)acrylic monomers, and wherein the binder polymer has an average particle size from 50 to 250 nm is provided.

20 Claims, No Drawings

POLYMERIC POWDER COMPOSITION AND A METHOD OF PRODUCING SAME

FIELD OF INVENTION

The instant invention relates to a polymeric powder composition and method of producing the polymeric powder composition.

BACKGROUND OF THE INVENTION

Polymer latexes (and core/shell polymer latexes having a "hard" shell, with a glass transition temperature of equal to or greater than 60° C., tend to be more friable and exhibit significant dusting as solids. The friability of such polymers present serious safety issues when spray drying, addressed by drying equipment explosion protection. The particles resulting from drying of droplets of such emulsion polymers contain thousands of individual latex particles, having no cohesive force holding them. Such dry particles are often broken down to smaller fragments during handling, thereby increasing the severity of a dust explosion. The presence of even a low quantity of dust in the atmosphere of a factory poses a significant combustion/explosion risk. Therefore, a polymeric powder composition lowering such risks would be beneficial.

SUMMARY OF THE INVENTION

The instant invention is a polymeric powder composition and method of producing the powder composition.

In one embodiment, the instant invention provides a polymeric powder composition prepared from an emulsion blend comprising: from 95 to less than 100 percent by weight latex based substrate polymer, wherein the latex based substrate polymer comprises units derived from one or more monomers selected from the group consisting of alkyl (meth)acrylates, functionalized alkyl(meth)acrylates styrene, acrylonitrile, butadiene, chloroprene, vinyl chloride, (meth)acrylates, vinyl acetate and combinations of two or more thereof and wherein the latex based substrate polymer has glass transition temperature is equal to or greater than 60° C. and an average particle size between 100 nm and 10 µm; and from greater than 0 to 5 percent by weight binder latex polymer, wherein the binder has a Tg of equal to or less than 10° C. and has units derived from one or more (meth)acrylic monomers, and wherein the binder polymeric composition has an average particle size from 50 to 250 nm; wherein a dry powder polymeric composition prepared from the emulsion blend by spray drying or fluidized spray drying exhibits no more than a 25% decrease in median particle size after attrition testing and no more than a 50% increase in the fraction of particles <45 µm after the attrition testing.

DETAILED DESCRIPTION OF THE INVENTION

The instant invention is a polymeric powder composition, and method of producing the same.

The polymeric powder composition prepared from an emulsion blend according to the present invention comprises from 95 to less than 100 percent by weight latex based substrate polymer, wherein the latex based substrate polymer comprises units derived from one or more monomers selected from the group consisting of alkyl (meth)acrylates, functionalized alkyl(meth)acrylates styrene, acrylonitrile, butadiene, chloroprene, vinyl chloride, (meth)acrylates, vinyl acetate, and combinations of two or more thereof and wherein the latex based substrate polymer has a Tg equal to or greater than 60° C., an average particle size between 100 nm and 10 µm; and from greater than 0 to 5 percent by weight binder polymer, wherein the binder latex polymer has a Tg of equal to or less than −10° C. and has units derived from one or more (meth)acrylic monomers, and wherein the binder polymer has an average particle size from 50 to 250 nm; wherein a dry powder prepared from the emulsion blend by spray drying or fluidized spray drying exhibits no more than a 25% decrease in median particle size after attrition testing and no more than a 50% increase in the fraction of particles <45 µm after the attrition testing.

The term "(meth)acrylate," as used herein, means acrylate or methacrylate.

(Meth)acrylate monomers used herein include, by way of example, C1-C18 (meth)acrylates, such as, butyl acrylate, ethylacrylate, 2-ethyl hexyl acrylate, propyl acrylate, methyl acrylate, hexyl acrylate, butylmethacrylate, methylmethacrylate, ethylhexyl methacrylate, stearyl acrylate, benzyl acrylate, cyclohexyl methacrylate, isobornyl methacrylate, tetrahydrofurfuryl methacrylate, cyclopentyl methacrylate, trifluoroethylmethacrylate, hydroxyethylmethacrylate and dicyclopentadienyl methacrylate and blends thereof, and combinations thereof.

All individual values and subranges from 95 to less than 100 percent by weight latex based substrate polymer are included herein and disclosed herein; for example the amount of latex based substrate polymer can be from a lower limit of 95, 95.5, 96, 96.5, 97, 97.5, 98, 98.5, 99, 99.5 or 99.8 percent by weight to an upper limit of 95.5, 96, 96.5, 97, 97.5, 98, 98.5, 99, 99.5 or 99.9 percent by weight. For example, the amount of latex based substrate polymer may be in the range of from 95 to less than 100 percent by weight, or in the alternative, the amount of latex based substrate polymer may be in the range of from 95 to 97.5 percent by weight, or in the alternative, the amount of latex based substrate polymer may be in the range of from 97.5 to less than 100 percent by weight, or in the alternative, the amount of latex based substrate polymer may be in the range of from 96 to 98 percent by weight.

All individual values and subranges of a glass transition temperature equal to or greater than 60° C. are included herein and disclosed herein; for example, the glass transition temperature of the latex based substrate polymer can have a lower limit of 60, 62, 64, 66, 68, 70 or 72° C.

All individual values and subranges of the latex based substrate polymer average particle size between 100 nm and 10 µm are included herein and disclosed herein; for example, the average particle size of the substrate polymer can be from a lower limit of 100, 1000, 2000, 3000, 4000, 5000, 6000, 7000, 8000 or 9000 nm to an upper limit of 500, 1500, 2500, 3500, 4500, 5500, 6500, 7500, 8500, 9500, or 10000 nm. For example, the average particle size of the substrate polymer may be in the range of from 100 nm to 10000 nm, or in the alternative, the average particle size of the substrate polymer may be in the range of from 100 to 5000 nm, or in the alternative, the average particle size of the substrate polymer may be in the range of from 5000 to 10000 nm, or in the alternative, the average particle size of the substrate polymer may be in the range of from 2500 to 7500 nm.

All individual values and subranges from greater than 0 to 5 percent by weight binder latex polymer are included herein and disclosed herein; for example, the amount of binder latex polymer can be from a lower limit of 0.05, 0.1, 0.5, 1.5, 2.5, 3.5, or 4.5 percent by weight to an upper limit of 0.1, 1, 2, 3, 4 or 5 percent by weight. For example, the amount of binder latex polymer may be in the range of from greater than 0 to 5 percent by weight, or in the alternative, the amount of binder latex polymer may be in the range of from greater than 0 to 5 percent by weight, or in the alternative, the amount of binder latex polymer may be in the range of from greater than 0.1 to 2.5 percent by weight, or in the alternative, the amount of binder latex polymer may be in the range of from greater than 1.25 to 2.5 percent by weight, or in the alternative, the amount of binder latex polymer may be in the range of from greater than 2.5 to 5 percent by weight.

All individual values and subranges of a Tg of equal to or less than 10° C. of the binder polymer are included herein and disclosed herein; for example, the Tg of the binder polymer can be from an upper limit of 3, 4, 5, 6, 7, 8, 9 or 9.9° C.

All individual values and subranges from 50 to 250 nm of average particle size of the binder polymer are included herein and disclosed herein; for example, the binder polymer average particle size can range from a lower limit of 50, 80, 110, 140, 170, 200, 230, or 240 nm to an upper limit of 60, 90, 120, 150, 180, 210, 240 or 250 nm. For example, the binder polymer average particle size may be in the range from 50 to 250 nm, or in the alternative, the binder polymer average particle size may be in the range from 150 to 250 nm, or in the alternative, the binder polymer average particle size may be in the range from 50 to 150 nm, or in the alternative, the binder polymer average particle size may be in the range from 75 to 150 nm, or in the alternative, the binder polymer average particle size may be in the range from 175 to 250 nm.

All individual values and subranges of no more than a 25% decrease in median particle size ?] after attrition testing of a dry powder prepared from the emulsion blend by spray drying or fluidized spray drying are included herein and disclosed herein; for example the decrease in median particle size can be from an upper limit of 5, 10, 15, 20, or 25%.

All individual values and subranges of no more than a 50% increase in the fraction of particles having a median particle size of <45 µm after the attrition testing of a dry powder prepared from the emulsion blend by spray drying or fluidized spray drying are included herein and disclosed herein; for example, the increase in the fraction of particles having a median particle size of <45 µm can be from an upper limit of 5, 15, 25, 35, 45, or 50%.

In an alternative embodiment, the substrate polymer further comprises units derived from one or more crosslinking monomers. Such crosslinkers include, for example, divinylbenzene; vinyl group-containing monomers including; allyl compounds including allyl (meth)acrylate, diallyl fumarate, diallyl phthalate, diallylacrylamide, triallyl (iso)cyanurate, and triallyl trimelitate; (poly)alkylene glycol di(meth)acrylate compounds including ethylene glycol dimethacrylate (EGDMA), diethylene glycol dimethacrylate, 1,6-hexanediol di(meth)acrylate, (poly)ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, trimethylolpropane tri(meth)acrylate, dipentaerythritol hexa(meth)acrylate, dipentaerythritol penta(meth)acrylate, and glycerol tri(meth)acrylate and mixtures and combination thereof.

In an alternative embodiment, the substrate polymer further comprises units derived from one or more graft-linking agents. Such graft-linking agents include, for example, allyl methacrylate, diallyl maleate and allyl acryloxypropionate.

In an alternative embodiment, the instant invention further provides a method for making a polymeric powder composition which comprises preparing by emulsion polymerization a latex based substrate polymer comprising units derived from one or more monomers selected from the group consisting of alkyl (meth)acrylates, functionalized alkyl(meth)acrylates styrene, acrylonitrile, butadiene, chloroprene, vinyl chloride, (meth)acrylates, vinyl acetate, and combinations of two or more thereof and wherein the latex based substrate polymer has an average particle size between 100 nm and 10 µm; preparing by emulsion polymerization a binder polymer comprising units derived from one or more (meth)acrylic monomers, having a Tg of equal to or less than 10° C. and an average particle size from 50 to 250 nm; and blending the substrate and binder latexes, followed by spray drying or fluidized spray drying to produce a dry powder exhibiting no more than a 25% decrease in median particle size after attrition testing and no more than a 50% increase in the fraction of particles <45 µm after the attrition testing.

In an alternative embodiment, the instant invention provides a polymeric powder composition and method of making a polymeric powder composition, in accordance with any of the preceding embodiments, except that the latex based substrate polymer has a core/shell structure.

In an alternative embodiment, the instant invention provides a polymeric powder composition and method of making a polymeric powder composition, in accordance with any of the preceding embodiments, except that the binder latex polymer does not have a core/shell structure.

In an alternative embodiment, the instant invention provides a polymeric powder composition and method of making a polymeric powder composition, in accordance with any of the preceding embodiments, except that the binder polymer has an average particle size of less than 150 nm.

In an alternative embodiment, the instant invention provides a polymeric powder composition and method of making a polymeric powder composition, in accordance with any of the preceding embodiments, except that the binder polymer has a Tg of less than −30° C.

In an alternative embodiment, the instant invention provides a polymeric powder composition and method of making a polymeric powder composition, in accordance with any of the preceding embodiments, except that the substrate polymer has a Tg greater than 70° C.

In an alternative embodiment, the instant invention provides a polymeric powder composition and method of making a polymeric powder composition, in accordance with any of the preceding embodiments, except that the substrate polymer has a core/shell structure having more than one shell layer and wherein an outermost layer has a Tg of greater than 70° C.

In an alternative embodiment, the instant invention provides a polymeric powder composition and method of making a polymeric powder composition, in accordance with any of the preceding embodiments, except that the binder polymer is present in an amount of from 1 to 5 wt % based on the weight of the dry powder.

In an alternative embodiment, the instant invention provides a polymeric powder composition and method of making a polymeric powder composition, in accordance with any of the preceding embodiments, except that the substrate polymer comprises units derived from one or more monomers selected from the group of styrene, methyl methacrylate, vinyl chloride, acrylonitrile, alkyl (meth)acrylates, methacrylic acid, and combinations of two or more thereof.

In an alternative embodiment, the instant invention provides a polymeric powder composition and method of making a polymeric powder composition, in accordance with any of the preceding embodiments, except that the binder polymer comprises up to 100% by weight units derived from butyl acrylate, ethyl acrylate, and/or ethylhexyl acrylate, from 0 to 2% by weight (meth)acrylic acid. All individual values and subranges up to 100% by weight units derived from butyl acrylate, ethyl acrylate, and/or ethylhexyl acrylate are included herein and disclosed herein; for example, the amount of units derived from butyl acrylate, ethyl acrylate, and/or ethylhexyl acrylate can range from a lower limit of 5, 15, 25, 35, 45, 55, 65, 75, 85 95 or 100% by weight to an upper limit of 8, 18, 28, 38, 48, 58, 68, 78, 88, 98 or 100% by weight. For example, the amount of units derived from butyl acrylate, ethyl acrylate, and/or ethylhexyl acrylate may range from 50 to 95% by weight, or in the alternative, the amount of units derived from butyl acrylate, ethyl acrylate, and/or ethylhexyl acrylate may range from 35 to 75% by weight, or in the alternative, the amount of units derived from butyl acrylate, ethyl acrylate, and/or ethylhexyl acrylate may range from 45 to 85% by weight, or in the alternative, the amount of units derived from butyl acrylate, ethyl acrylate, and/or ethylhexyl acrylate may range from 85 to 100% by weight.

All individual values and subranges from 0 to 2% by weight units derived from (meth)acrylic acid are included herein and disclosed herein; for example, the amount of units derived from (meth)acrylic acid can range from a lower limit of 0, 0.1, 0.5, 1, 1.5, or 1.75% by weight to an upper limit of 0.4, 0.9, 1.4, 1.8, or 2% by weight. For example, the amount of units derived from (meth)acrylic acid may range from 0 to 2% by weight, or in the alternative, the amount of units derived from (meth)acrylic acid may range from 0.8 to 1.2% by weight, or in the alternative, the amount of units derived from (meth)acrylic acid may range from 1.25 to 2% by weight, or in the alternative, the amount of units derived from (meth)acrylic acid may range from 0.1 to 1.25% by weight, or in the alternative, the amount of units derived from (meth)acrylic acid may range from 0.5 to 1.75% by weight.

In an alternative embodiment, the instant invention provides a polymeric powder composition and method of making a polymeric powder composition, in accordance with any of the preceding embodiments, except that the composition further comprises additional additives including, but are not limited to, antistatic agents, color enhancers, dyes, lubricants, fillers, flame retardants, pigments, primary antioxidants, secondary antioxidants, processing aids, impact modifiers, UV stabilizers, blends thereof, and combinations thereof. The inventive thermoplastic compositions may contain any amounts of additives. The inventive thermoplastic compositions may compromise from greater than 0 to less than 60 weight percent of the combined weight of such additives, based on the weight of the inventive thermoplastic composition including such additives. All individual values and subranges from about 0 to about 60 wt percent are included herein and disclosed herein; for example, the inventive thermoplastic compositions may compromise from 0 to 60 wt % of the combined weight of additives; or from 0 to 50 wt %; or from 0 to 30 wt %; or from 0 to 20 wt %; or from 0 to 10 wt %; or from 0 to 5 wt %.

In an alternative embodiment, the instant invention provides a polymeric powder composition prepared from an emulsion blend comprising: from 95 to less than 100 percent by weight latex based substrate polymer, wherein the latex based substrate polymer comprises units derived from one or more monomers selected from the group consisting of alkyl (meth)acrylates, functionalized alkyl(meth)acrylates styrene, acrylonitrile, butadiene, chloroprene, vinyl chloride, (meth)acrylates, vinyl acetate, and combinations of two or more thereof and wherein the latex based substrate polymer has a Tg equal to or greater than 60° C. and an average particle size between 100 nm and 10 μm; and from greater than 0 to 5 percent by weight binder latex polymer, wherein the binder has a Tg of equal to or less than −10° C. and has units derived from one or more (meth)acrylic monomers, and wherein the binder polymer has an average particle size from 50 to 250 nm; wherein a dry powder prepared from the emulsion blend by spray drying or fluidized spray drying exhibits no more than a 25% decrease in median particle size after attrition testing and no more than a 50% increase in the fraction of particles <45 μm after the attrition testing.

In another embodiment, the instant invention provides a polymeric powder composition prepared from an emulsion blend consisting essentially of: from 95 to less than 100 percent by weight latex based substrate polymer, wherein the latex based substrate polymer comprises units derived from one or more monomers selected from the group consisting of alkyl (meth)acrylates, functionalized alkyl (meth)acrylates styrene, acrylonitrile, butadiene, chloroprene, vinyl chloride, (meth)acrylates, vinyl acetate, and combinations of two or more thereof and wherein the latex based substrate polymer has a Tg equal to or greater than 60° C. and an average particle size between 100 nm and 10 μm; and from greater than 0 to 5 percent by weight binder latex polymer, wherein the binder has a Tg of equal to or less than 10° C. and has units derived from one or more (meth)acrylic monomers, and wherein the binder polymer has an average particle size from 50 to 250 nm; wherein a dry powder prepared from the emulsion blend by spray drying or fluidized spray drying exhibits no more than a 25% decrease in median particle size after attrition testing and no more than a 50% increase in the fraction of particles <45 μm after the attrition testing.

In yet another embodiment, the instant invention provides a method for making a polymeric powder composition consisting essentially of: preparing by emulsion polymerization a latex based substrate polymer comprising units derived from one or more monomers selected from the group consisting of alkyl (meth)acrylates, functionalized alkyl(meth)acrylates styrene, acrylonitrile, butadiene, chloroprene, vinyl chloride, (meth)acrylates, vinyl acetate, and combinations of two or more thereof and wherein the latex based substrate polymer has a Tg equal to or greater than 60° C. and an average particle size between 100 nm and 10 μm; preparing by emulsion polymerization a binder polymer comprising units derived from one or more (meth)acrylic monomers, having a Tg of equal to or less than or equal to −10° C. and an average particle size from 50 to 250 nm; and blending the substrate and binder polymers by spray drying or fluidized spray drying to produce a dry powder exhibiting no more than a 25% decrease in median particle size after attrition testing and no more than a 50% increase in the fraction of particles <45 μm after the attrition testing.

Examples

The following examples illustrate the present invention but are not intended to limit the scope of the invention.

Preparation of Latex Based Substrate Polymer, Component (A)

The following emulsion polymerization process was used to prepare Component (A):

600 parts deionized water, 0.15 parts NaEDTA (sodium salt of ethylene diamine tetra-acetate) and 0.03 parts of iron sulfate heptahydrate were charged to a round bottom 5 liter glass reactor. The mixture in the glass reactor was stirred at 100 rpm and heated to 40° C. with nitrogen sparging for 30 minutes. The mixture in the glass reactor was maintained at 40(±2)° C. A monomer emulsion mixture of: (1) 1500 parts methyl methacrylate, 1.5 parts of butyl mercaptopriopionate, 0.018 gms of ethylene glycol dimethacrylate (EGDMA), and 135 parts of sodium dodecylbenzene sulfonate, was then fed into the glass reactor over a period of 4 hours. At the same time, (2) a solution of 3.6 parts of sodium persulfate in 190 parts water; and (3) a solution of 1.2 parts of sodium formaldehyde sulfoxylate in 190 grams of water was fed into the glass reactor over a period of 5 hours. That is, the feeds of components (2) and (3) continued for 1 hour following the termination of the feed of the monomer emulsion. During the feed of components (1), (2) and (3) the temperature of the mixture in the glass reactor was maintained at 40±2° C. After all of the components (1)-(3) were fed into the glass reactor, the temperature of the mixture in the glass reactor, a latex, was raised to 60° C. and held at that temperature for 30 minutes before cooling and filtering the latex. The pH of the latex was adjusted to between 6.8 and 7.0 by first adding 0.2 wt % (based on total polymer) monosodium phosphate solution (10% soln.) and then 0.6 wt % (based on total polymer) disodium phosphate solution (10% soln.) dropwise until the pH was brought into the desired range. Particle size was measured by light scattering technique to be 230 nm.

Preparation of Binder Polymer, Component (B):

The following emulsion polymerization process was used to prepare component B used in the inventive examples 1200 parts deionized water, 0.03 parts NaEDTA (sodium salt of ethylene diamine tetra-acetate) and 0.15 parts of iron sulfate heptahydrate, along with 110 parts of a 10% solution of sodium dodecyl benzene sulfonate surfactant were charged to a round bottom 5 liter glass reactor. The contents of the glass reactor was stirred at 150 rpm and heated to 37° C. while being sparged with nitrogen for 30 minutes. A monomer emulsion mixture of: (1) 1090 parts ethyl acrylate, 11 parts of acrylic acid, 610 parts of deionized water, and 220 parts of sodium dodecyl benzene sulfonate (10% solution), was then prepared by adding the above ingredients to a 2 L beaker and stirring it with a glass rod.

A solution of 3 parts of tert-butyl hydroperoxide in 86 parts water, component (2); and a solution of 3 parts of sodium formaldehyde sulfoxylate in 86 parts of water, component (3) were prepared. 10% of monomer emulsion (1), which is 193 grams, and 6 wt % of (2) and (3) which is 5.3 parts each, were added to the reactor. After addition of the components (1), (2) and (3) the reaction mixture was allowed to exotherm.

15 minutes after the exotherm, 45% of (1), 30% each of (2) and (3) were added as a shot to the reactor and once again the reactor was allowed to exotherm. The reactor was cooled to 45° C. and the remaining 45% of monomer emulsion (1) and 30% each of (2) and (3), were added to the reactor, once again as a shot. After the exotherm, the reaction mixture was held at 70° C. and the remaining 34% (2) and (3) were added to the reactor as a chase. The final particle size (Component B-1) was measured by Brookfield Instruments' BI 90 particle size analyzer, to be 60 nm. The resulting latex was filtered through a cheese cloth and used for subsequent dust analysis studies.

A larger particle size version (Component B-2) was prepared by reducing the initial 10% addition of monomer emulsion to 2%. This resulted in a polyethyl acrylate latex of particle size 230 nm.

Latex blends of components (A) and (B) were prepared and either spray dried or freeze dried resulting in a dry polymer powder.

Table 1 illustrates the compositions of Inventive Examples 1-3 and Comparative Example 1.

TABLE 1

| Example | Weight % Component (A) | Weight % Component (B)/Particle size, nm |
|---|---|---|
| Inventive Example 1 | 97.4% | 2.0%/230 nm |
| Inventive Example 2 | 97.4% | 2.6%/65 nm |
| Inventive Example* 3 | 97.4% | 2.6%/65 nm |
| Comparative Example* 1 | 100% | 0%/n,a. |

*Inventive Example 3 and Comparative Example 1 latexes were freeze dried and ground up to a median particle size of 64 and 62 microns, respectively.

Table 2 illustrates the median particle size, % of particles having a size of <45 microns and changes in such values before and after attrition testing for each of the Inventive Examples ("Inv. Ex.") and Comparative Examples ("Comp. Ex.").

TABLE 2

| | Before Attrition Test | | After Attrition Test | | | |
|---|---|---|---|---|---|---|
| Example | Median particle size of spray or freeze dried powder | % spray or freeze dried powder <45 u | Median particle size of spray or freeze dried powder | % of spray or freeze dried powder <45 u | % decrease in particle size after attrition | % increase in particles <45 μm after attrition |
| Inv. Ex. 1 | 50 | 44 | 39 | 63 | 22% | 43% |
| Inv. Ex. 2 | 62 | 29 | 53 | 40 | 14% | 38% |
| Inv. Ex. 3 | 46 | 49 | 39 | 56 | 16% | 15% |
| Comp, Ex. 1 | 43 | 51 | 30 | 78 | 31 | 53% |

Table 3 illustrates the Kst and Minimum Ignition Energy (MIE) for each of the Inventive and Comparative Examples.

TABLE 3

| Example | Kst, (bar · m. · sec−1)/ $P_{max}$ Bar | MIE (mJ) |
|---|---|---|
| Inventive Example 1 | 342/7.98 | 5-8 |
| Inventive Example 2 | 258-285/7.6-8.1 | 5-13 |

Test Methods

Test methods include the following:

Maximum explosion pressure (MEP) is referred to as the difference between the pressure at ignition time (ambient pressure) and the pressure at a culmination point of explosion. Both the MEP and explosion severity (Kst) value were measured in a 20 liter apparatus or in a 1 m³ vessel at different polymer powder (fuel) concentrations according to test conditions specified in ISO 6184/1 (1995) and ASTM Standard E1226 (1991). All measurements were performed by Fike Technologies In., Blue Springs, Mo. The test is done over a wide range of concentrations in each case a maximum pressure value is obtained. Minimum ignition energy (MIE) is the lowest electrically induced ignition energy obtained by means of a capacitive discharge which is able to produce ignition of a polymer dust cloud. The test device used was a Hartmann Vertical Tube of 1 liter volume and the measurements were performed according to ASTM E-2019 Standard Test method. The energy is calculated from the equation $E = \frac{1}{2} CV^2$, where C is the electrical capacitance of the capacitors connected to the discharge circuit and V is the electrical voltage applied.

Polymer particle size was measured using very dilute aqueous dispersions, i.e., latexes (diluted to 0.001% solids) with a BI 90 (Brookhaven Instruments, Holtsville, N.Y.) particle size detector, utilizing Dynamic Light Scattering (15° and 90° scattering angles) and a laser light source. The signal was detected by a photodiode array and the data analyzed with a built in correlator. The attrition test is performed according to the following procedure: First, particle size of the powder from spray dryer is measured using a light scatter instrument with Malvern Mastersizer (Malvern Instruments, Worcestershire, UK. median particle size as well as percentage of particle size <45μ is reported by the instrument). Then 100 g of 3/16" diameter stainless steel ball bearings and 50 g of powder into a solid pan with lid and "milled" for 10 minutes in a "Ro-Tap" screen shaker instrument (RX30 Ro-tap, W.S. Tyler Inc., Mentor, Ohio). The powder particle size is re-measured and final result recorded is the change before/after in median particle size and %<45 um dust values.

The present invention may be embodied in other forms without departing from the spirit and the essential attributes thereof, and, accordingly, reference should be made to the appended claims, rather than to the foregoing specification, as indicating the scope of the invention.

We claim:

1. A polymeric powder composition prepared from an emulsion blend comprising:
   from 95 to less than 100 percent by weight latex based substrate polymer, wherein the latex based substrate polymer comprises units derived from one or more monomers selected from the group consisting of alkyl (meth)acrylates, functionalized alkyl(meth)acrylates styrene, acrylonitrile, butadiene, chloroprene, vinyl chloride, (meth)acrylates, vinyl acetate, and combinations of two or more thereof and wherein the latex based substrate polymer has a Tg equal to or greater than 60° C. and an average particle size between 100 nm and 10 μm; and
   from greater than 0 to 5 percent by weight binder latex polymer, wherein the binder has a Tg of equal to or less than 10° C. and has units derived from one or more (meth)acrylic monomers, and wherein the binder polymer has an average particle size from 50 to 250 nm;
   wherein a dry powder prepared from the emulsion blend by spray drying or fluidized spray drying exhibits no more than a 25% decrease in median particle size after attrition testing and no more than a 50% increase in the fraction of particles <45 μm after the attrition testing.

2. The polymeric powder composition according to claim 1, wherein the latex based substrate polymer has a core/shell structure.

3. The polymeric powder composition according to claim 1, wherein the binder latex polymer does not have a core/shell structure.

4. The polymeric powder composition according to claim 1, wherein the binder polymer has an average particle size of less than 150 nm.

5. The polymeric powder composition according to claim 1, where the binder latex polymer has a Tg of less than −30° C.

6. The polymeric powder composition according to claim 1, wherein the substrate polymer has a core/shell structure having more than one shell layer and wherein an outermost layer has a Tg of greater than 70° C.

7. The polymeric powder composition according to claim 1, wherein the binder polymer is present in an amount of from 1 to 5% by weight based on the weight of the dry powder.

8. The polymeric powder composition according to claim 1, wherein the substrate polymer comprises units derived from one or more monomers selected from the group of styrene, methyl methacrylate, vinyl choride, acrylonitrile, alkyl (meth)acrylates, and methacrylic acid.

9. The polymeric powder composition according to claim 1, wherein the binder polymer comprises greater than 98% by weight units derived from butyl acrylate, ethyl acrylate, and/or ethylhexyl acrylate, 0.1 to 2% by weight (meth)acrylic acid.

10. A method for making a polymeric powder composition comprising:
    preparing by emulsion polymerization a latex based substrate polymer comprising units derived from one or more monomers selected from the group consisting of alkyl (meth)acrylates, functionalized alkyl(meth)acrylates styrene, acrylonitrile, butadiene, chloroprene, vinyl chloride, (meth)acrylates, vinyl acetate, and combinations of two or more thereof and wherein the latex based substrate polymer has a Tg equal to or greater than 60° C. and an average particle size between 100 nm and 10 μm;
    preparing by emulsion polymerization a binder polymer comprising units derived from one or more (meth)acrylic monomers, having a Tg of equal to or less than or equal to −10° C. and an average particle size from 50 to 250 nm; and
    blending the substrate and binder polymers by spray drying or fluidized spray drying to produce a dry powder exhibiting no more than a 25% decrease in median particle size after attrition testing and no more than a 50% increase in the fraction of particles <45 μm after the attrition testing.

11. The method according to claim 10, wherein the blending is by batch or in-line continuous blending.

12. The method according to claim 10, wherein the latex based substrate polymer is prepared by emulsion polymerization such as to impart to the substrate polymer a core/shell structure.

13. The method according to claim 10, wherein the binder latex polymer is prepared such as to impart a non-core/shell structure to the binder latex polymer.

14. The method according to claim 10, wherein the binder polymer has an average particle size of less than 150 nm.

15. The method according to claim 10, where the binder latex polymer has a Tg of less than −30° C.

16. The method according to claim 10, wherein the substrate polymer has a Tg greater than 70° C.

17. The method according to claim 10, wherein the substrate polymer has a core/shell structure having more than one shell layer and wherein an outermost layer has a Tg of greater than 70° C.

18. The method according to claim 10, wherein the binder polymer is present in an amount of from 1 to 5% by weight, based on the weight of the dry powder.

19. The method according to claim 10, wherein the substrate polymer comprises units derived from one or more monomers selected from the group of styrene, methyl methacrylate, vinyl choride, acrylonitrile, alkyl (meth)acrylates, and methacrylic acid.

20. The method according to claim 10, wherein the binder polymer comprises from greater than 98% by weight units derived from butyl acrylate, ethyl acrylate, and/or ethylhexyl acrylate, 0.1 to 2% by weight (meth)acrylic acid.

\* \* \* \* \*